US012362518B2

(12) United States Patent
Yeh et al.

(10) Patent No.: US 12,362,518 B2
(45) Date of Patent: Jul. 15, 2025

(54) CONNECTOR INCLUDING SPRINGLESS POSITION-RETURNING STRUCTURE

(71) Applicant: BIZLINK INTERNATIONAL CORP., New Taipei (TW)

(72) Inventors: Chun-Lun Yeh, New Taipei (TW); Pin-Ru Lin, New Taipei (TW)

(73) Assignee: BIZLINK INTERNATIONAL CORP., New Taipei (TW)

( * ) Notice: Subject to any disclaimer, the term of this patent is extended or adjusted under 35 U.S.C. 154(b) by 387 days.

(21) Appl. No.: 18/058,273

(22) Filed: Nov. 23, 2022

(65) Prior Publication Data

US 2023/0163525 A1 May 25, 2023

(30) Foreign Application Priority Data

Nov. 23, 2021 (TW) ................................ 110143571

(51) Int. Cl.

| | |
|---|---|
| ***H01R 13/631*** | (2006.01) |
| ***H01R 13/627*** | (2006.01) |
| ***H01R 13/629*** | (2006.01) |
| ***H01R 13/639*** | (2006.01) |

(52) U.S. Cl.

CPC ......... *H01R 13/631* (2013.01); *H01R 13/627* (2013.01); *H01R 13/62927* (2013.01); *H01R 13/639* (2013.01)

(58) Field of Classification Search

CPC ................ H01R 13/631; H01R 13/627; H01R 13/62927; H01R 13/639

USPC .................................................. 439/374, 352

See application file for complete search history.

(56) References Cited

U.S. PATENT DOCUMENTS

| | | | | |
|---|---|---|---|---|
| 11,165,199 B2 * | 11/2021 | Xu ..................... | H01R 13/6335 | |
| 2003/0142917 A1 | 7/2003 | Merrick | | |
| 2006/0258201 A1 * | 11/2006 | Schwiebert .......... | G02B 6/4246 | 439/352 |
| 2012/0251049 A1 | 10/2012 | Meadowcroft et al. | | |
| 2019/0041593 A1 | 2/2019 | Zhang et al. | | |

FOREIGN PATENT DOCUMENTS

| | | |
|---|---|---|
| CN | 105164560 B | 3/2017 |
| CN | 214227247 U | 9/2021 |

* cited by examiner

*Primary Examiner* — Tulsidas C Patel
*Assistant Examiner* — Thaslimur Rahman
(74) *Attorney, Agent, or Firm* — CKC & Partners Co., LLC

(57) ABSTRACT

A connector includes a housing, a handle, and an arm member. Two sides of the housing are provided with guiding grooves extending in a forward-backward direction. An upper surface of the housing has at least two protrusions. The arm member is connected to the handle. The arm member includes two guiding arms, a connecting wall, and two elastic rods. The guiding arms are respectively movably embedded in the corresponding guiding grooves. The connecting wall is connected to the guiding arms and is located between the guiding arms. Each of the elastic rods includes a bending portion. The elastic rods respectively abut against the protrusions and are arranged in series at the same height.

14 Claims, 9 Drawing Sheets

200'

200

CONNECTOR INCLUDING SPRINGLESS POSITION-RETURNING STRUCTURE

CROSS-REFERENCE TO RELATED APPLICATION

This application claims priority to Taiwan Application Serial Number 110143571, filed Nov. 23, 2021, which is herein incorporated by reference.

BACKGROUND

Technical Field

The present disclosure relates to a connector, and more particularly, to a connector including a springless position-returning structure.

Description of Related Art

At present, a small form-factor pluggable (SFP) connector is a common optical/electrical communication transceiver module. Usually, a locking mechanism is provided on the SFP connector. When the SFP connector is docked with a socket connector, the SFP connector needs to be inserted into a storage device (i.e., a plugged member) first, and the locking mechanism is used to fix the SFP connector in the storage device to ensure the safety of docking with the socket connector. When the connectors needs to be disconnected, the user pulls back the handle of the SFP connector to drive the guiding arms to slide along the housing of the locking connector, and retract the unlocking pieces at the ends to separate the SFP connector from the storage device. When the hand of the user releases, the position-returning unit in the SFP connector will provide restoring force to restore the guiding arms to their original state.

Most of the existing position-returning units use cylindrical springs to provide restoring force, but this design has the problems of complicated assembly and high cost. In view of this, some manufacturers have developed various springless position-returning mechanisms. For example, the slope of the housing of the SFP connector is used to cooperate with the deformation of the handle to provide the restoring force, or an elastic arm structures that are overlapped up and down are produced by a molding process to buckle the recesses of the housing to provide the restoring force. However, no matter the slope design or the overlapping elastic arm structures is adopted, in addition to the high production cost of the position-returning unit, it is necessary to make corresponding adjustments to the housing before it can be applied, and the practicability is not high.

Accordingly, it is necessary to provide a connector including a springless position-returning unit with a simple design and low cost.

SUMMARY

An aspect of the disclosure is to provide a connector that can efficiently solve the aforementioned problems.

According to an embodiment of the disclosure, a connector includes a housing, a handle, and an arm member. Two sides of the housing are respectively provided with guiding grooves extending in a forward-backward direction. An upper surface of the housing has at least two protrusions. The arm member is connected to the handle. The arm member includes two guiding arms, a connecting wall, and two elastic rods. The guiding arms are movably embedded in the guiding grooves respectively. The connecting wall is connected to the guiding arms and located between the guiding arms. The elastic rods each include a bending portion. The elastic rods respectively abut against the protrusions and are arranged in series at the same height.

According to an embodiment of the disclosure, a connector includes a housing and an unlocking module. Two sides of the housing are respectively provided with guiding grooves extending in a forward-backward direction. An upper surface of the housing has at least two protrusions. The unlocking module includes an arm member and a handle connected to each other. The arm member includes two guiding arms, a connecting wall, and two elastic rods. The guiding arms are movably embedded in the guiding grooves respectively. The connecting wall is connected to the guiding arms and located between the guiding arms. The elastic rods are respectively connected to the guiding arms. The elastic rods respectively abut against the protrusions and are arranged in series. Each of the elastic rods has a bending portion and a contacting portion. The contacting portion is connected to a corresponding one of the guiding arms through the bending portion. At least a part of the bending portion is covered by the handle and is accommodated therein.

In an embodiment of the disclosure, each of the elastic rods extends from a corresponding one of the guiding arms in a direction facing another of the guiding arms.

In an embodiment of the disclosure, the elastic rods are parallel to each other when not pressed by the protrusions, and the elastic rods are elastically deformed and inclined to each other when pressed by the protrusions respectively.

In an embodiment of the disclosure, the arm member is composed of a bent metal sheet and has a uniform thickness.

In an embodiment of the disclosure, the arm member further includes two supporting plates. The supporting plates are formed by extending backward from distal ends of the guiding arms respectively. Each of the supporting plates includes at least one through hole.

In an embodiment of the disclosure, the handle wraps at least a part of the supporting plates.

In an embodiment of the disclosure, the elastic rods are formed by bending inward from upper portions of side surfaces of the distal ends of the guiding arms respectively. A minimum angle between one of the elastic rods and a corresponding one of the guiding arms is not less than 70 degrees. Each of the supporting plates extends outward from a lower portion of the side surface of the distal end of a corresponding one of the guiding arms in a manner of first expanding and then contracting. A gap exists between each of the elastic rods and an adjacent one of the supporting plates. The handle wraps the supporting plates, the bending portions of the elastic rods, and the gap. The connecting wall extends backward and forms a baffle plate for covering the elastic rods.

In an embodiment of the disclosure, each of the elastic rods has a free end. A maximum stroke of the free end in the forward-backward direction is less than 5 mm.

In an embodiment of the disclosure, a shortest linear distance between each of the protrusions and the handle is 35% to 65% of a shortest linear distance between the guiding arms.

Due to the application of the above technical solutions, the connector of the present disclosure has at least the following advantages compared with the prior art: simple structure, low cost, easy and fast unlocking during use, long service life, and easy assembly.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
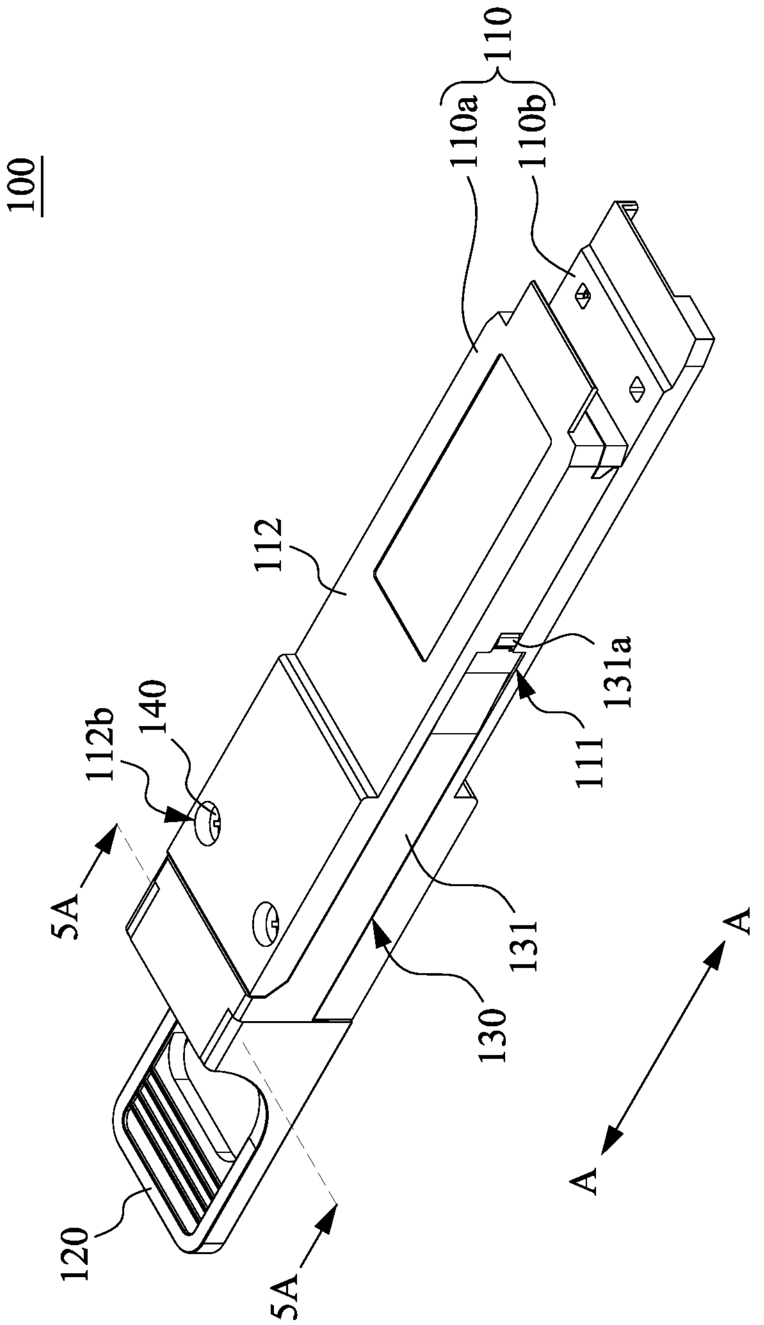
FIG. 1 is a perspective view of a connector according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

FIGS. 1 to 4 and 6 of the drawings of the present disclosure are drawn according to actual scales. Therefore, the size of the connector 100 conforms to the SFP standard except that the relative size of each component is part of the content of the specification. In this regard, the absolute size of each element in the drawings can also be calculated accurately, so the absolute size of each element should also be regarded as a part of the present disclosure.

Figure 2:
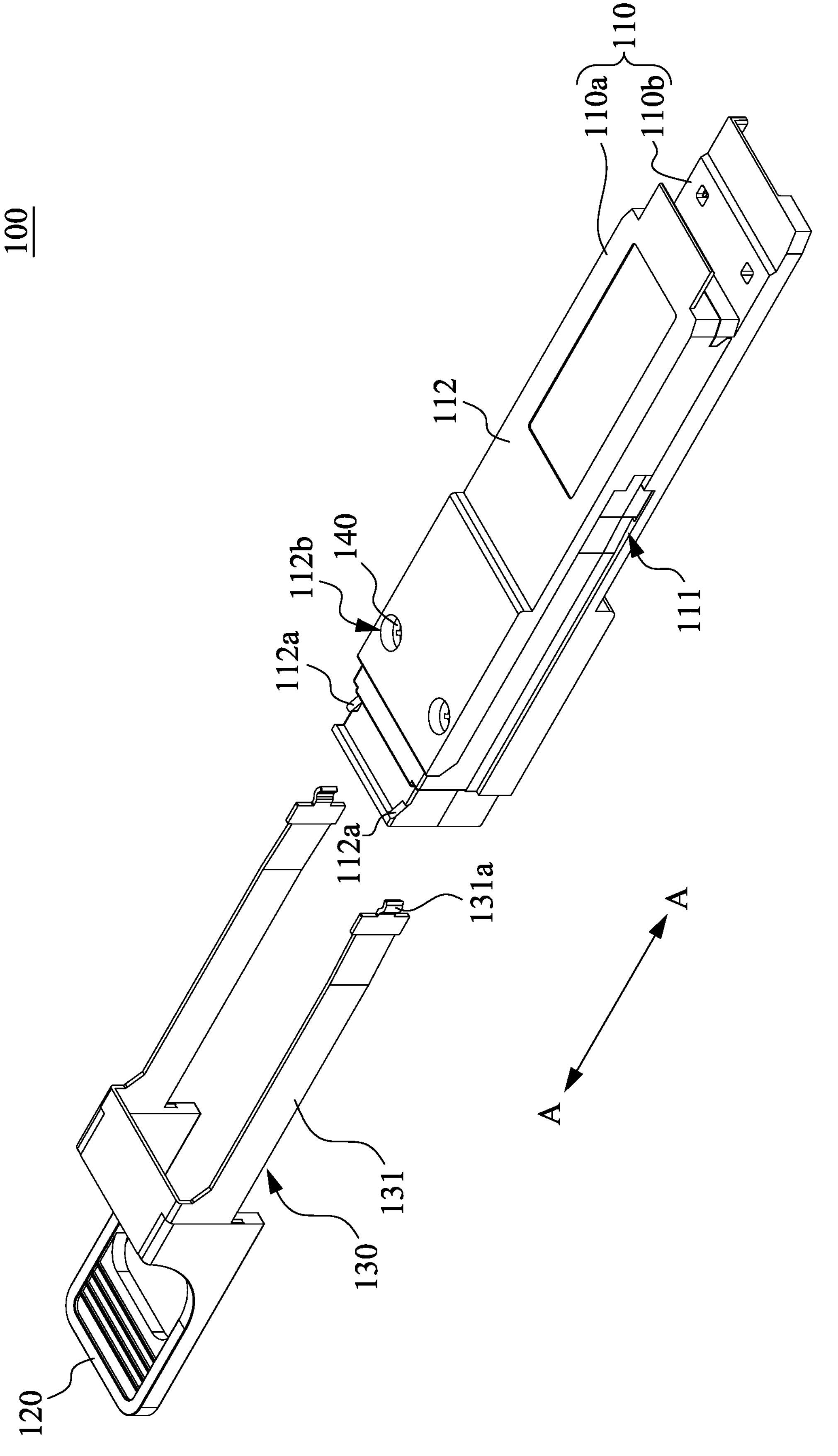
FIG. 2 is another perspective view of the connector in FIG. 1, in which a housing and an unlocking module are separated.
Figure 3:
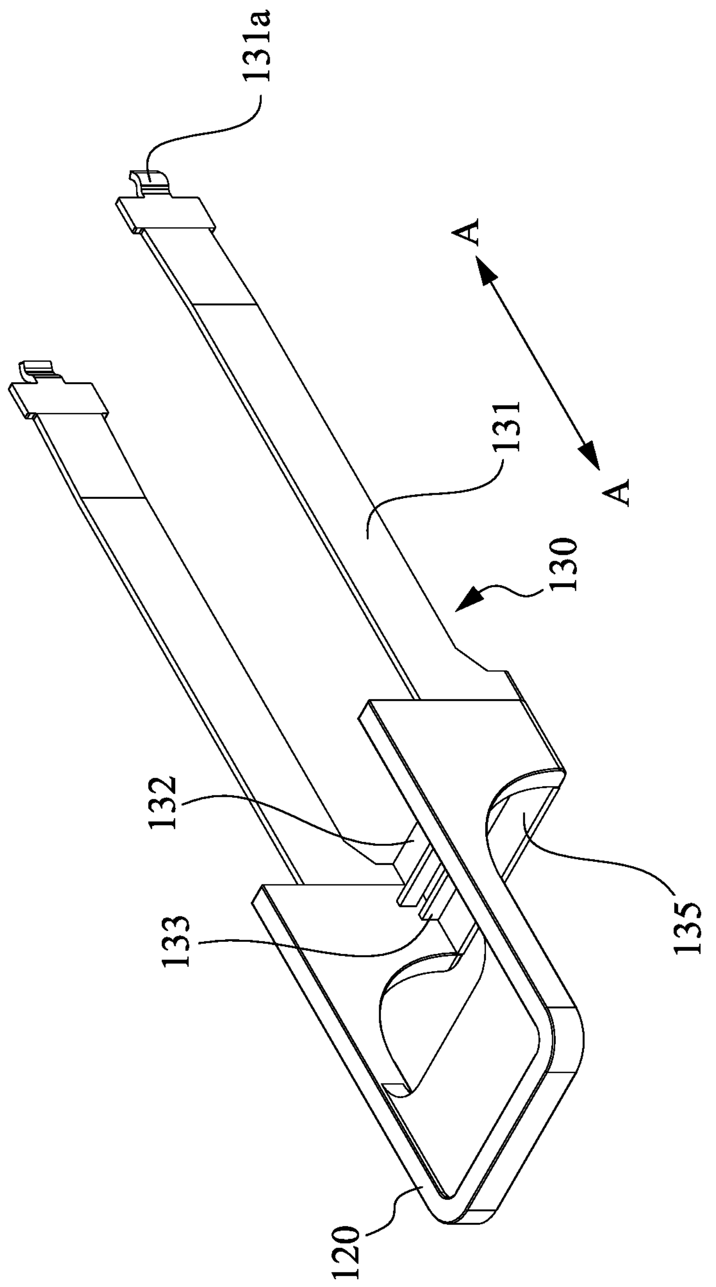
FIG. 3 is a perspective view of the unlocking module in FIG. 1.
Figure 4:
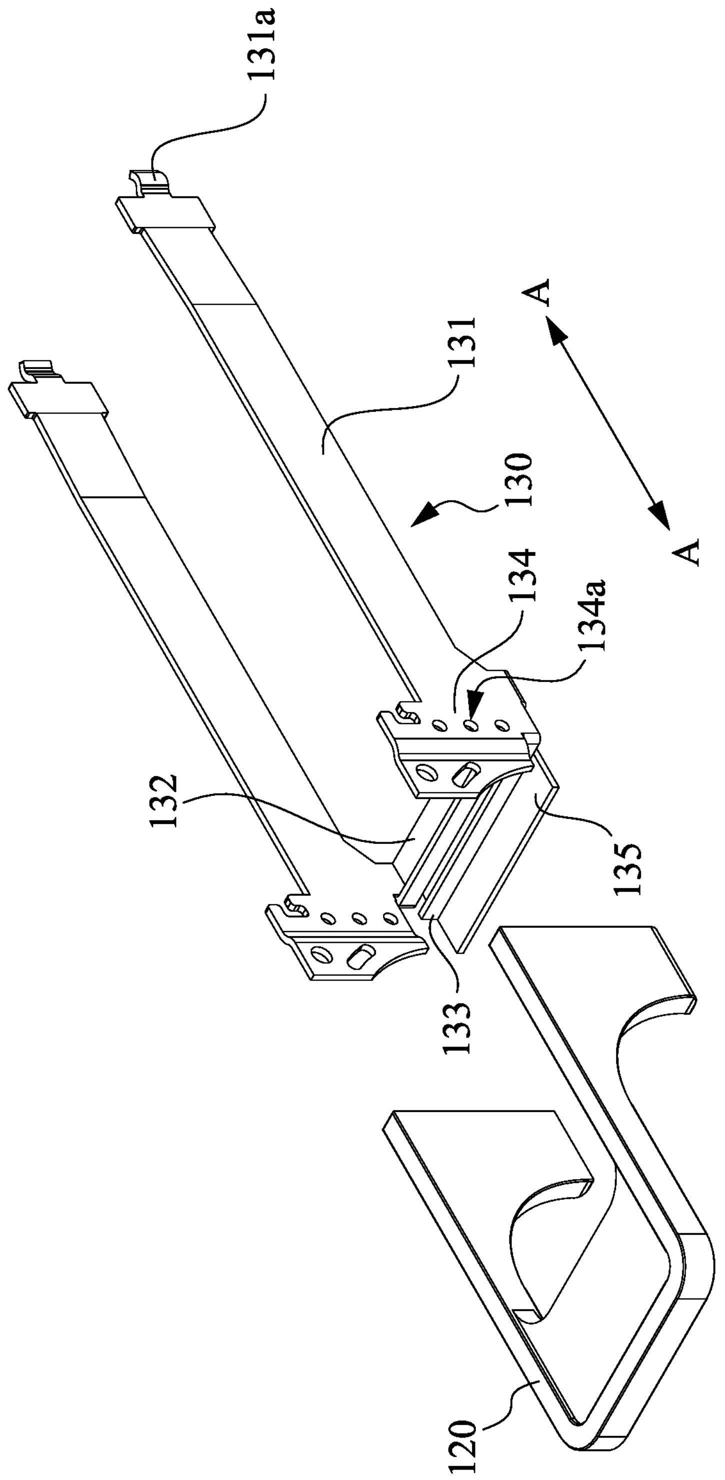
FIG. 4 is an exploded view of the unlocking module in FIG. 1.
Figure 5A:
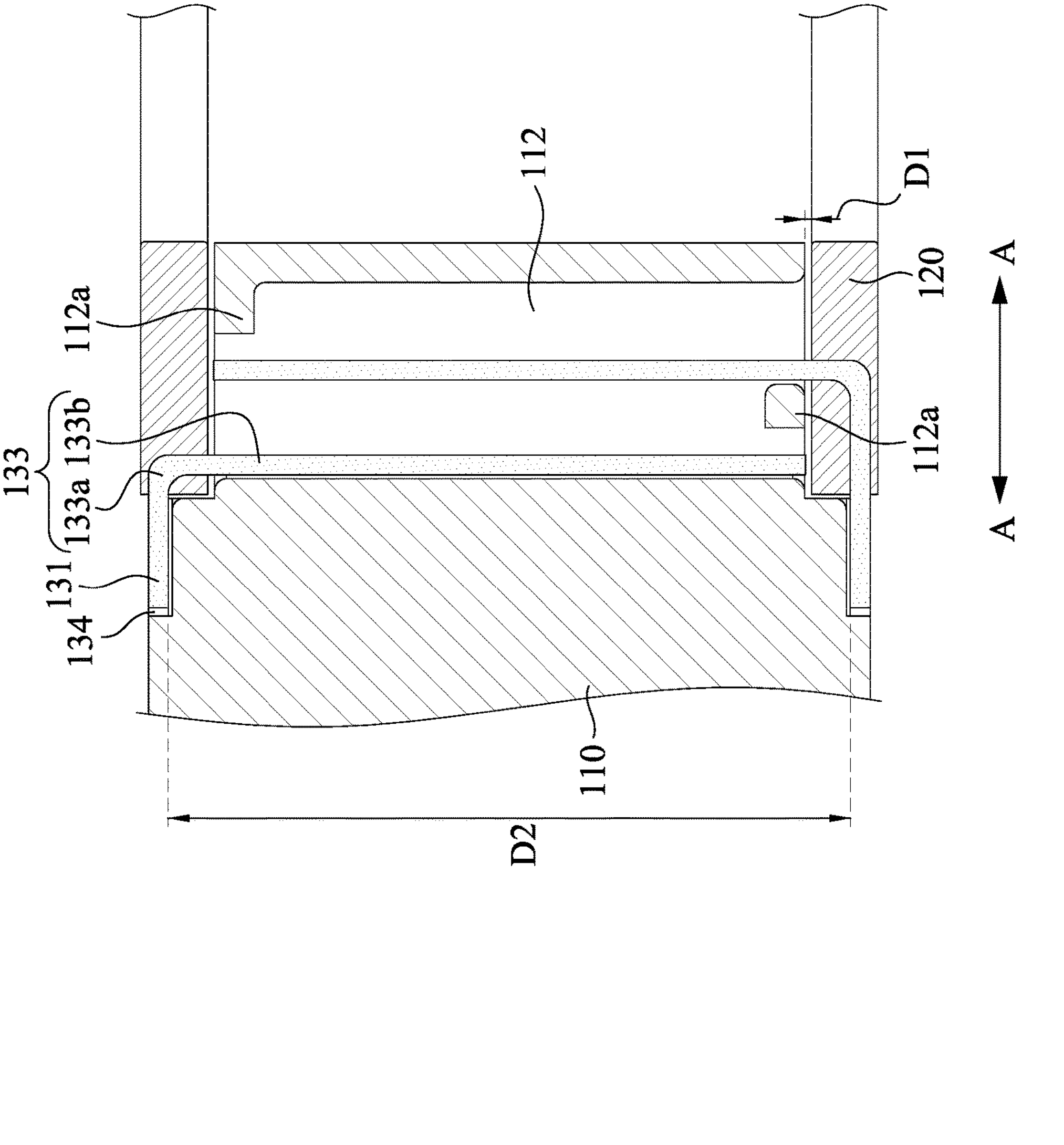
FIG. 5A is a schematic diagram showing a cross section of the connector in FIG. 1 when viewed along a direction 5A.
Figure 5B:
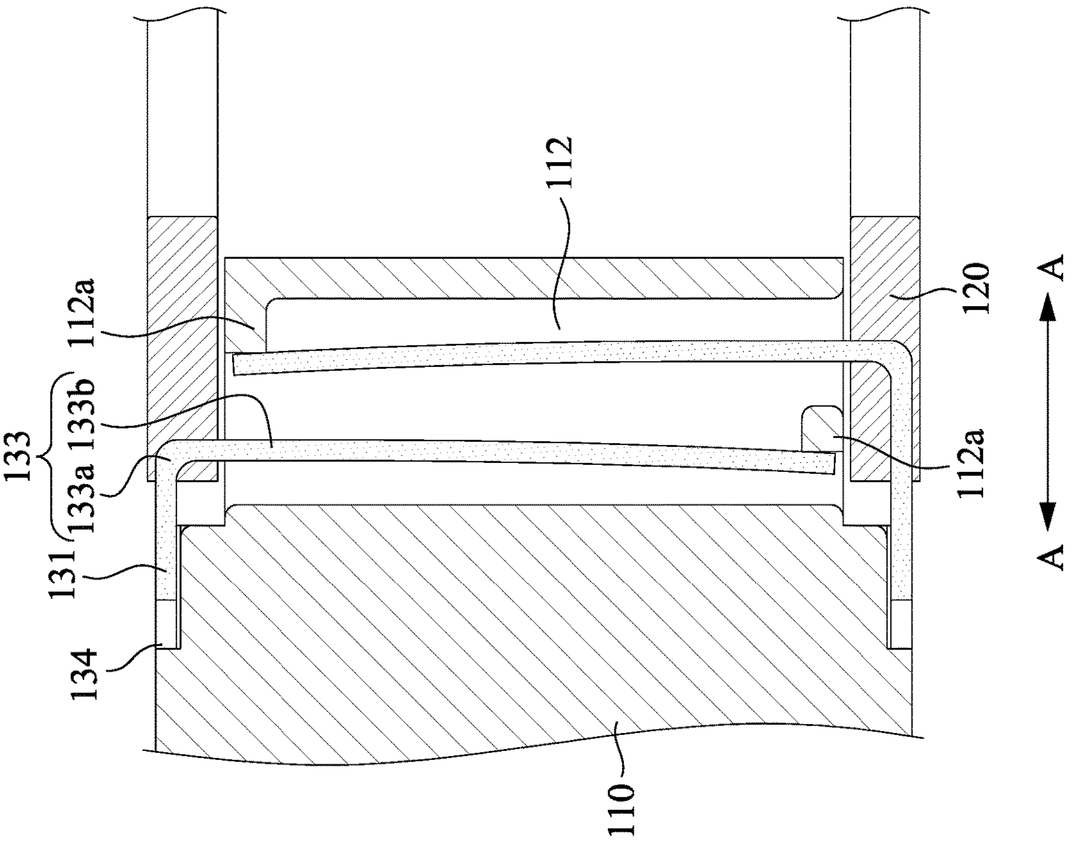
FIG. 5B is a schematic diagram showing another cross section of the connector in FIG. 1 when viewed along a direction 5A.

Reference is made to FIGS. 1 to 5B. FIG. 1 is a perspective view of a connector 100 according to an embodiment of the present disclosure. FIG. 2 is another perspective view of the connector 100 in FIG. 1, in which a housing 110 and an unlocking module are separated. FIG. 3 is a perspective view of the unlocking module in FIG. 1. FIG. 4 is an exploded view of the unlocking module in FIG. 1. FIG. 5A is a schematic diagram showing a cross section of the connector 100 in FIG. 1 when viewed along a direction 5A. FIG. 5B is a schematic diagram showing another cross section of the connector 100 in FIG. 1 when viewed along a direction 5A.

As shown in FIGS. 1 and 2, the connector 100 of the present embodiment is a connector for pluggable connection with a plugged member (not shown in the figures, such as a storage device) having elastic plates.

In some embodiments, the housing 110 includes an upper case 110*a* and a lower case 110*b* which are engaged together. The housing 110 after being engaged together is substantially a rectangular parallelepiped. Two ends of the housing 110 in a forward-backward direction A are the front end and the rear end, respectively. The front end constitutes an insertion end for inserting the plugged member, and the rear end constitutes a handle end. Therefore, "front" referred to below refers to relatively close to the front end of the housing 110 (i.e., the insertion end), and "rear" refers to relatively close to the rear end of the housing 110 (i.e., the handle end).

In some embodiments, the upper case 110*a* and the lower case 110*b* may be connected by plurality sets of plugging assemblies and fixing assemblies. The plugging assemblies may take various structural forms. For example, a set of plugging assembly includes a convex portion provided on the upper case 110*a* and a concave portion provided on the lower case 110*b*, or a set of plugging assembly includes a concave portion provided on the upper case 110*a* and a convex portion provided on the lower case 110*b*. The convex portion and the concave portion are engaged with each other. The fixing assemblies may include screw holes 112*b* and screws 140 matched with the screw holes 112*b*, and the screw holes 112*b* and the screws 140 are formed on the upper case 110*a* and the lower case 110*b*, respectively. The connection between the upper case 110*a* and the lower case 110*b* can be better achieved by adding the fixing assemblies on the basis of the plugging assemblies.

In some embodiments, the upper case 110*a* and the lower case 110*b* are made of metal, but the present disclosure is not limited thereto.

As shown in FIGS. 1 and 2, in the present embodiment, two sides of the housing 110 are respectively provided with guiding grooves 111 extending in the forward-backward direction A. According to FIG. 5A, an upper surface 112 of the housing 110 has two protrusions 112*a* close to the rear end of the housing 110.

As shown in FIGS. 3 to 5A, in the present embodiment, the unlocking module of the connector 100 includes an arm member 130 and a handle 120 connected to each other. The arm member 130 includes two guiding arms 131, a connecting wall 132, and two elastic rods 133. The guiding arms 131 are movably embedded in the guiding grooves 111 at the two sides of the housing 110, respectively. The front ends of the guiding arms 131 form unlocking pieces 131*a* that can cooperate with the elastic plates. The connecting wall 132 is connected to the guiding arms 131 and located between the guiding arms 131. The elastic rods 133 are respectively connected to the guiding arms 131 and arranged in series along the forward-backward direction A. The elastic rods 133 can respectively abut against the protrusions 112*a* of the housing 110 directly, or indirectly with an adhesive layer or like disposed therebetween. In some embodiments, the elastic rods 133 are located at the same height relative to the upper surface 112 of the housing 110. When necessary, the elastic rods 133 may be designed not at the same height, but the benefit will be relatively insignificant. In addition, as shown in FIG. 5A, the elastic rods 133 each have a bending portion 133*a* and a contacting portion 133*b*.

The contacting portion 133*b* is connected to a corresponding one of the guiding arms 131 through the bending portion 133*a*. At least a part of the bending portion 133*a* is covered by the handle 120 and is accommodated therein. As shown in FIG. 5A, an entirety of the bending portion 133*a* of each of the elastic rods 133 is covered in the interior of the handle 120. In the present embodiment, the uncovered portions protruding from the left side in the figure are parts of the guiding arms 131. Each of the elastic rods 133 extends from a corresponding one of the guiding arms 131 in a direction facing another of the guiding arms 131.

As shown in FIG. 5A, the elastic rods 133 are parallel to each other when not pressed by the protrusions 112*a* of the upper surface 112 of the housing 110. As shown in FIG. 5B, when a user holds the handle 120 and pulls the entire unlocking module away from the housing 110 along the forward-backward direction A, the elastic rods 133 will be pressed by the protrusions 112*a* of the upper surface 112 of the housing 110 to be elastically deformed and inclined to each other respectively. In some embodiments, each of the elastic rods 133 has a free end (that is, the end of the contacting portion 133*b* away from the bending portion 133*a*). A maximum stroke of the free end in the forward-backward direction A is less than 5 mm.

Figure 6:
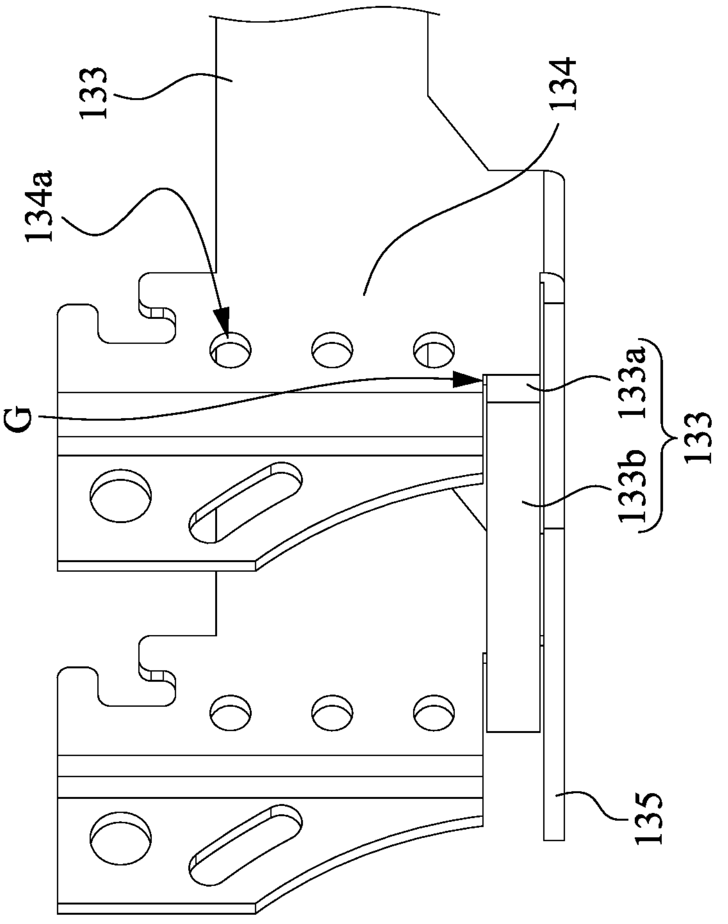
FIG. 6 is a partial enlarged view showing some components of the unlocking module in FIG. 4.

Reference is made to FIG. 6. FIG. 6 is a partial enlarged view showing some components of the unlocking module in FIG. 4. As shown in FIGS. 4 and 6, in the present embodiment, the arm member 130 further includes two supporting plates 134. The supporting plates 134 are formed by extending backward from distal ends of the guiding arms 131 respectively. Each of the supporting plates 134 includes a plurality of through holes 134*a*. Specifically, as shown in FIGS. 3 and 4, the handle 120 wraps at least the parts of the supporting plates 134 having the through holes 134*a*. Thereby, each of the through holes 134*a* allows glue to enter during the molding process to enhance the bonding strength between the arm member 130 and the handle 120. The handle 120 wraps at least a part of the supporting plates 134. In addition, as shown in FIG. 6, each of the supporting plates 134 is provided with an opening 134*b* (not a through hole) at the upper right in the figure. The design of the opening 134*b* is also beneficial to the connection strength between the handle 120 and the arm member 130.

Furthermore, as shown in FIG. 4 or 6, in the present embodiment, a gap G exists between each of the elastic rods 133 and an adjacent one of the supporting plates 134. In addition, the handle 120 further wraps the supporting plates 134, the bending portions 133*a* of the elastic rods 133, and the gap G. In addition, the connecting wall 132 extends backward and forms a baffle plate 135 for covering the elastic rods 133.

In some embodiments, the material of the handle 120 is a material that can be used for molding, such as a flexible polymer material or various plastics, but the present disclosure is not limited thereto.

In detail, as shown in FIG. 5A, the elastic rods 133 are formed by bending inward from upper portions of side surfaces of the distal ends of the guiding arms 131 respectively. A minimum angle between one of the elastic rods 133 and a corresponding one of the guiding arms 131 is not less than 70 degrees at any time after the molding is completed (including after the deformation). For example, in FIG. 4, the guiding arms 131 extend along the forward-backward direction A, the elastic rods 133 extend along the direction perpendicular to the forward-backward direction A, and the angle at this time is about 90 degrees, but the disclosure is not limited to this.

In the present embodiment, a shortest linear distance D1 between each of the protrusions 112*a* and the handle 120 is 80% to 100% of a shortest linear distance D2 between the guiding arms 131. However, in application, depending on the demand for restoring force, the shortest linear distance D1 between each of the protrusions and the handle can be adjusted to be 35% to 65% of the shortest linear distance D2 between the guiding arms 131 (not shown). That is, each of the protrusions 112*a* may be disposed at a position closer to the middle of a corresponding one of the contacting portions 133*b*, rather than near the end of the corresponding one of the contacting portion 133*b* as shown in FIGS. 5A and 5B.

As shown in FIG. 6, in the present embodiment, each of the supporting plates 134 extends outward from an end of the side surface of the distal end of a corresponding one of the guiding arms 131 in a manner of first expanding and then contracting (i.e., the upper side in the figure). Each of the elastic rods 133 is disposed on the other end of the side surface of the distal end of a corresponding one of the guiding arms 131 (i.e., the lower side in the figure). That is, the elastic rods 133 and the guiding arms 131 are separated by a gap G (see FIG. 6) and are adjacent to each other up and down. When using the connector 100, the user can insert the connector 100 into a plugged member (e.g., a storage device). The unlocking pieces 131*a* on the two guiding arms 131 of the unlocking module and the corresponding elastic plates in the storage device are engaged and fixed to be locked. When the connector 100 needs to be pulled out, the handle 120 of the unlocking module is pulled backward, and the handle 120 drives the connecting wall 132 and the elastic rods 133 connected thereto to move backward. Since the elastic rods 133 abut against the protrusions 112*a* on the upper surface 112 of the housing 110 respectively, the elastic rods 133 will be squeezed by the protrusions 112*a* during the movement, thereby driving the two guiding arms 131 and the unlocking pieces 131*a* thereon to push out the elastic plates in the storage device. In this way, unlocking can be achieved to smoothly pull out the connector 100. After the connector 100 is pulled out, the handle 120 is released, and the deformed elastic rods 133 will elastically recover, thereby driving the two guiding arms 131 to return their original positions.

Figure 7:
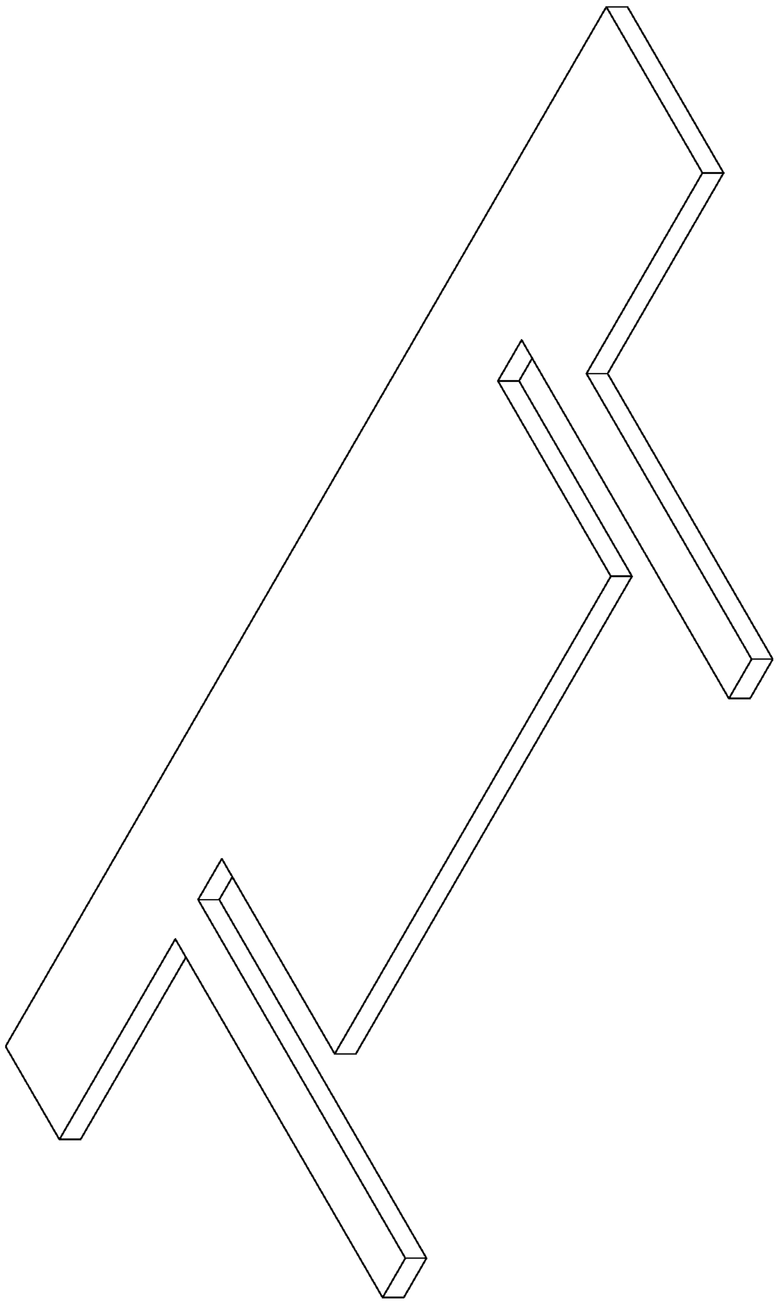
FIG. 7 is a three-dimensional schematic diagram illustrating a metal sheet according to another embodiment of the present disclosure.
Figure 8:
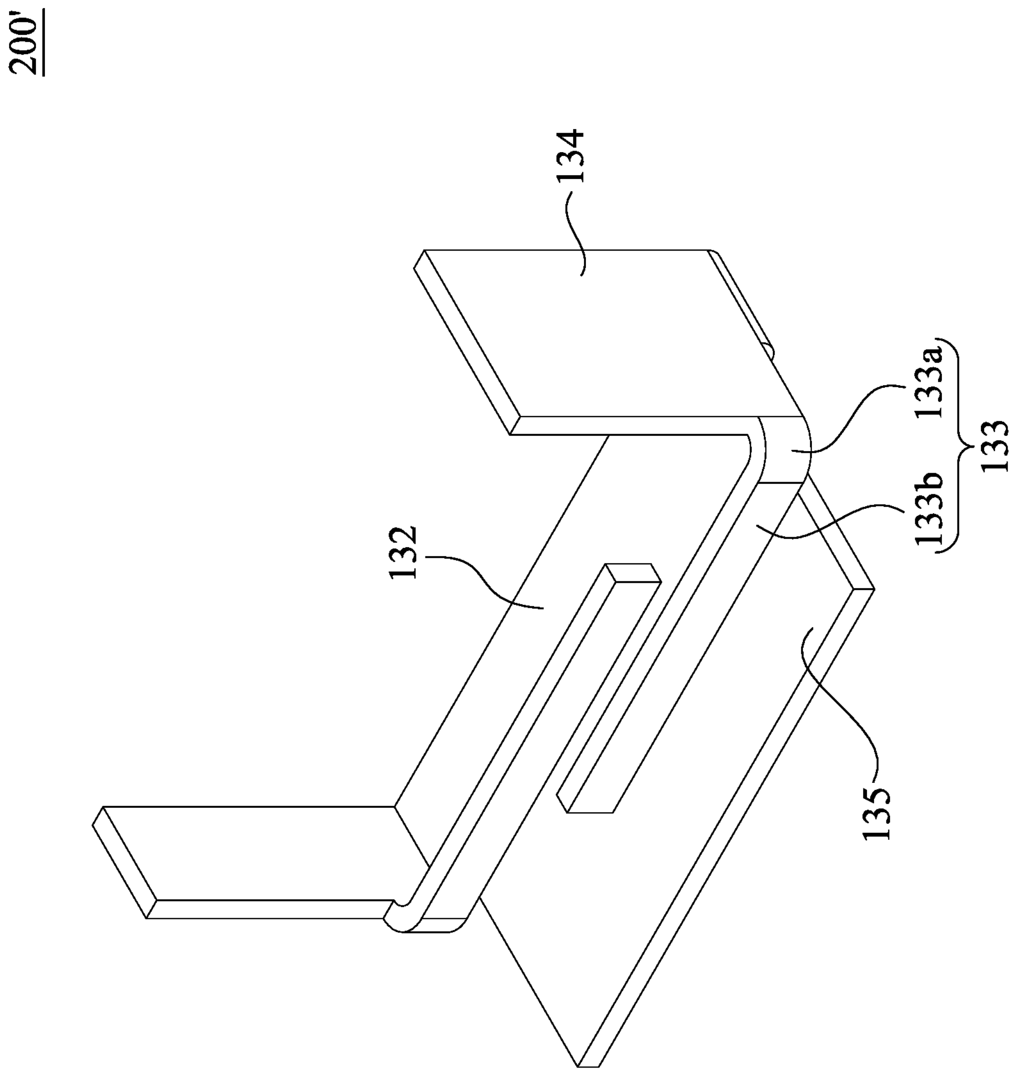
FIG. 8 is a perspective view of the metal sheet in FIG. 7 after being bent.

Reference is made to FIGS. 7 and 8. FIG. 7 is a three-dimensional schematic diagram illustrating a metal sheet 200 according to another embodiment of the present disclosure. FIG. 8 is a perspective view of the metal sheet 200 in FIG. 7 after being bent. From FIGS. 7 and 8, the general formation of the arm member 130 can be roughly understood. In the present embodiment, the arm member 130 of the unlocking module may be formed of a bent metal sheet 200' and has a uniform thickness. Specifically, both sides of the metal sheet 200 can be bent upward first, and the central portion of the metal sheet 200 forms the connecting wall 132 and the baffle plate 135. Next, the upwardly bent portions on both sides of the metal sheet 200 may be further bent to form the supporting plates 134 and the elastic rods 133 connected to each other. It can be seen that, according to the above-mentioned manufacturing processes, the arm member 130 of the present embodiment at least has the advantages of easy manufacturing and low manufacturing cost.

According to the foregoing recitations of the embodiments of the disclosure, it can be seen that the connector of the present disclosure can be unlocked and return to the original position without a spring, which not only has a simple structure, low cost, but also is easy and fast to be unlocked.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A connector, comprising:
a housing, two sides of the housing being respectively provided with guiding grooves extending in a forward-backward direction, an upper surface of the housing having at least two protrusions;
a handle; and
an arm member connected to the handle, the arm member comprising:
two guiding arms movably embedded in the guiding grooves respectively;
a connecting wall connected to the guiding arms and located between the guiding arms; and
two elastic rods each comprising a bending portion, the elastic rods respectively abutting against the protrusions and being arranged in series at the same height,
wherein each of the elastic rods extends from a corresponding one of the guiding arms in a direction facing another of the guiding arms, the elastic rods are substantially parallel to each other when not pressed by the protrusions, and the elastic rods are elastically deformed and inclined to each other when pressed by the protrusions respectively.

2. The connector of claim 1, wherein the arm member is composed of a bent metal sheet and has a uniform thickness.

3. The connector of claim 2, wherein the arm member further comprises two supporting plates, the supporting plates are formed by extending backward from distal ends of the guiding arms respectively, and each of the supporting plates comprises at least one through hole.

4. The connector of claim 3, wherein the handle wraps at least a part of the supporting plates.

5. The connector of claim 4, wherein the elastic rods are formed by bending inward from upper portions of side surfaces of the distal ends of the guiding arms respectively, a minimum angle between one of the elastic rods and a corresponding one of the guiding arms is not less than 70 degrees, each of the supporting plates extends outward from a lower portion of the side surface of the distal end of a corresponding one of the guiding arms in a manner of first expanding and then contracting, a gap exists between each of the elastic rods and an adjacent one of the supporting plates, the handle wraps the supporting plates, the bending portions of the elastic rods, and the gap, and the connecting wall extends backward and forms a baffle plate for covering the elastic rods.

6. The connector of claim 5, wherein each of the elastic rods has a free end, and a maximum stroke of the free end in the forward-backward direction is less than 5 mm.

7. The connector of claim 4, wherein a shortest linear distance between each of the protrusions and the handle is 35% to 65% of a shortest linear distance between the guiding arms.

8. A connector, comprising:
a housing, two sides of the housing being respectively provided with guiding grooves extending in a forward-backward direction, an upper surface of the housing having at least two protrusions; and
an unlocking module comprising an arm member and a handle connected to each other, the arm member comprising:
two guiding arms movably embedded in the guiding grooves respectively;
a connecting wall connected to the guiding arms and located between the guiding arms; and
two elastic rods respectively connected to the guiding arms, the elastic rods respectively abutting against the protrusions and being arranged in series, each of the elastic rods having a bending portion and a contacting portion, the contacting portion being connected to a corresponding one of the guiding arms through the bending portion, at least a part of the bending portion being covered by the handle and being accommodated therein,
wherein each of the elastic rods extend from a corresponding one of the guiding arms in a direction facing another of the guiding arms, the elastic rods are substantially parallel to each other when not pressed by the protrusions, and the elastic rods are elastically deformed and inclined to each other when pressed by the protrusions respectively.

9. The connector of claim 8, wherein the arm member is composed of a bent metal sheet and has a uniform thickness.

10. The connector of claim 9, wherein the arm member further comprises two supporting plates, the supporting plates are formed by extending backward from distal ends of the guiding arms respectively, and each of the supporting plates comprises at least one through hole.

11. The connector of claim 10, wherein the handle wraps at least a part of the supporting plates.

12. The connector of claim 11, wherein the elastic rods are formed by bending inward from upper portions of side surfaces of the distal ends of the guiding arms respectively, a minimum angle between one of the elastic rods and a corresponding one of the guiding arms is not less than 70 degrees, each of the supporting plates extends outward from a lower portion of the side surface of the distal end of a corresponding one of the guiding arms in a manner of first expanding and then contracting, a gap exists between each of the elastic rods and an adjacent one of the supporting plates, the handle wraps the supporting plates, the bending portions of the elastic rods and the gap, and the connecting wall extends backward and forms a baffle plate for covering the elastic rods.

13. The connector of claim 12, wherein each of the elastic rods has a free end, and a maximum stroke of the free end in the forward-backward direction is less than 5 mm.

14. The connector of claim 11, wherein a shortest linear distance between each of the protrusions and the handle is 35% to 65% of a shortest linear distance between the guiding arms.

* * * * *